United States Patent Office 3,280,876
Patented Oct. 25, 1966

3,280,876
PROCESSING STEREOREGULAR POLYBUTADIENE CONTAINING HIGH STRUCTURE CARBON BLACK AND TIRE TREADS MADE THEREFROM
Carl W. Snow, Akron, Ohio, assignor to Ashland Oil & Refining Company, Houston, Tex., a corporation of Kentucky
No Drawing. Filed Feb. 3, 1966, Ser. No. 524,824
15 Claims. (Cl. 152—330)

This application is a continuation-in-part of my prior copending applications Serial Nos. 207,102 and 191,729, filed July 2, 1962, and May 2, 1962, respectively, and now abandoned.

This invention relates to the processing of synthetic rubber-like polymers. More particularly, it relates to the processing of synthetic rubber-like polybutadienes, especially those having a cis-1,4 isomer content comprising a large proportion of the sterical configuration of their 1,4 butadiene units. Still more particularly, this invention relates to vulcanizable compositions comprising polybutadienes and high structure carbon blacks, and pneumatic tires having tread portions prepared from such compositions.

Various stereo-regulated synthetic rubber-like polymers have recently reached a stage of development at which they are being considered, and to some extent being employed, as replacements for natural rubber and/or styrene-butadiene synthetic rubber-like polymers. Among those receiving considerable attention are various stereo-regular polybutadienes. Although the methods for preparing such polybutadienes may differ somewhat the polymers themselves are similar at least to the extent that a large proportion of the sterical configuration of the 1,4 butadiene units of each consists of the cis-1,4 isomer. Depending upon the particular stereo-regular polybutadiene, the cis-1,4 isomer content may range from about 40% up to as high as about 90% and even higher.

Stereo-regulated polybutadiene rubbers possess excellent abrasion resistance and hysteretic properties as well as good resistance to oxidation and low temperatures, all of which properties are essential for successful use in passenger, truck and other types of tire treads. In fact, stereo-regular polybutadiene rubbers are superior in abrasion resistance to both styrene-butadiene rubbers and natural rubber, and superior to styrene-butadiene rubbers in hysteresis. However, these stereo-regulated polymers are plagued by serious processing inadequacies when employed in existing factory equipment. Thus, they are well known to be quite deficient in the ability to mill readily, particularly at temperatures above 110° F., without mill bagging. They have also proved to be deficient in green strength and to be incapable of extruding uniformly with a smooth surface and with sharp edges. Moreover, they exhibit a substantially complete lack of tack, i.e., that property which permits a polymer to adhere to itself which is so essential in the construction of composite articles such as tires.

These various deficiencies can be overcome to some extent by milling the polymer in the presence of any of the well known softeners, although any improvement demonstrated is marginal at best. To enjoy the potential advantages offered by the outstanding properties of stereo-regulated polybutadienes, therefore, it has been necessary to employ them as extenders for other elastomers, particularly natural rubber and styrene-butadiene rubber-like polymers. While blends as high as 75 parts of polybutadiene and 25 parts of natural rubber or styrene-butadiene have been processed with some success, it is generally conceded that blends having a polybutadiene content not greater than about 50 parts are the most effective in minimizing the processing difficulties inherent in polybutadienes. The obvious drawback to this compromise approach to the problem is that it results in a loss of advantages attributable to the polybutadiene to the extent that the polybutadiene is replaced by the other elastomer.

It is a principal object of this invention, therefore, to facilitate the processing of synthetic rubber-like polybutadienes, particularly stereo-regular polybutadienes. It is a further object of this invention to facilitate the processing of polybutadienes without sacrificing the outstanding properties inherent in such polybutadienes. It is a still further object of this invention to facilitate milling and extrusion operations when practiced on such polybutadienes and to impart thereto sufficient tack such as will permit their use in conventional fabricating operations. Another object of this invention is to provide a vulcanizable rubber composition comprising a polybutadiene. An additional object is to provide a pneumatic tire having a tread portion comprising a vulcanized synthetic rubber compound containing a polybutadiene. Still another object of this invention is to obtain these ends in a manner which is simple and economical and which requires no additional operating equipment or added supervision of operating personnel.

In accordance with this invention, these objects have been met in a particularly effective manner. In general, the method of this invention involves incorporating in a polybutadiene unblended with any other elastomer, a carbon black within the fineness range of reinforcing furnace blacks and having an elevated structure level considerably beyond that of the reinforcing furnace blacks heretofore available, commonly referred to as standard reinforcing furnace blacks. This mixture so obtained handles exceptionally well on conventional milling equipment while the milled mass can be subjected to extrusion operations with results heretofore unattainable. In addition, the milled mass possesses the property of tack to such a degree as to render it readily susceptible to normal fabricating operations.

By the term "structure" as used throughout the specification and claims hereof is meant the degree of that phenomenon to which carbon black particles are associated or clustered to form chainlike, or rodlike, units of varying lengths and geometric configurations. Such formations may occur by virtue of the physical union of numerous particles and/or by virtue of the attractive forces between and among particles. In terms of the former, a minimum or low structure carbon black is accompanied by a minimum of physical union or "twinning" of particles with a substantial proportion of the particles discretely divorced each from all the others. As the degree of structure increases, an increase in the number of rodlike carbon black units as well as an increase in the length of such units is evidenced. In terms of the latter, a minimum or low structure results when the attractive forces between and among the carbon black particles decrease in magnitude below the point of interference. As these attractive forces increase, the degree of structure increases as a result of interferences between and among particles.

Structure of carbon black can be observed under an electron microscope, although minor differences in carbon black structure can only be observed by a trained and experienced operator. Structure manifests itself in a number of ways, however, among which is the relationship between structure and oil absorption. Thus, as the degree of carbon black structure increases, the capability to absorb oil correspondingly increases. From this phenomenon, there has been derived the oil absorption test for measuring the degree of structure. In general, this test involves the incremental addition of a standard linseed oil to a weighed quantity of black while working the mixture with a spatula. Oil addition is continued until the mixture reaches a predetermined consistency which constitutes the end point. The quantity of oil per quantity of black is the oil absorption factor and is usually measured in ml./gram, ml./100 grams, or gallons/100 pounds. While the mixing procedure and determination of the end point may vary with each individual conducting the test with corresponding variations in the oil absorption factor, nevertheless, the test is susceptible to reasonable reproducibility when practiced by the same individual and is accepted by the industry as a means for measuring the relative structure characteristics of different carbon blacks.

It has been suggested that since carbon blacks are classified into grades according to their degrees of fineness, each grade, on the basis of its surface area and oil absorption, can be further classified generally into the categories or levels of normal, high and low structures. (See Rubber Age, vol. 89, No. 2, pp. 269–282.) Considered as normal structure blacks are, among others, the channel blacks and superabrasion furnace black (SAF). Considered as high structure blacks are, among others, intermediate superabrasion furnace black (ISAF) and high abrasion furnace black (HAF). Considered as low structure blacks are the thermal blacks. Since those grades that are of concern with respect to the present invention are the reinforcing furnace blacks, i.e., HAF, ISAF and SAF in particular, further discussion will be limited to these grades and further reference herein to reinforcing furnace blacks will be intended to mean these three grades.

There are several methods for measuring surface area of carbon blacks, the most accurate of which is probably by means of the electron microscope. By electron microscope observation, the fineness ranges of HAF, ISAF and SAF grades of black have been measured as about 87.5–112.5 square meters/gram, 112.5–137.5 square meters/gram and 137.5–162.5 square meters/gram, respectively, or covering the general range of about 85–165 square meters/gram. As mentioned above, results of oil absorption tests, as a measurement of structure, may vary considerably depending to a great extent upon the individual conducting the test. Nevertheless, the test establishes that for blacks within the above fineness ranges, when produced by the conventional incomplete combustion furnace black process practiced in the absence of any modifications to the process intended specifically to influence structure, the oil absorption factors will be in the ranges of about 105–125 ml./100 grams, 115–135 ml./100 grams and 125–145 ml./100 grams, respectively, for HAF, ISAF and SAF. While the results of any given test may fall outside these ranges, the extent to which it does will not be so great as to render the ranges meaningless. These oil factors, then, are considered standard and any reference throughout the specifiaction and claims to "standard" HAF, ISAF and SAF grades of carbon black is intended to mean these grades possessing generally these oil factors.

In rubber technology, the property of modulus is defined as the force per unit of original cross-sectional area required to stretch a rubber specimen to a standard elongation. It is employed as a measure of the reinforcing effect of ingredients in rubber compounds. Once a standard test procedure using a standard test recipe has been established, therefore, it is possible to determine the effect the varying of a particular ingredient, e.g., carbon black, has on the property of modulus. It is recognized and accepted in the art, moreover, that the modulus value of a particular rubber specimen in which the carbon black has been varied from the standard is, when compared to the modulus value of the standard, a measure of the structure of the carbon black employed in the particular rubber specimen. Thus it is well known that the modulus value of a carbon black within a particular fineness range will vary directly, generally, with its structure value, i.e., the higher the modulus, the greater the degree of structure. Because the oil absorption test as a measure of structure is difficult to consistently reproduce accurately, and because the test for modulus is readily subject to accurate and consistent reproducibility even when conducted in different laboratories by different operators, the property of modulus is relied on and accepted in the art as a measure of the property of structure. For this same reason, it is also relied on throughout the specification and claims hereof as a measure of structure.

Wherever throughout the specification and claims modulus values are expressed for carbon black, such values have been obtained by use of testing method ASTM D–1522–60T, unless clearly stated to the contrary. This testing method for determining carbon black properties is practiced on natural rubber using as a carbon black control "Industry Reference Black No. 1" (IRB #1). Modulus of a particular carbon black is determined on a rubber specimen containing said carbon black which has been cured for 30 minutes. Modulus is expressed as a variance in pounds per square inch at 300% elongation from the modulus of IRB #1 as determined on rubber specimen containing it. By this test method, carbon blacks within the fineness ranges of HAF, ISAF and SAF grades of reinforcing furnace blacks and having generally the above referred to "standard" oil absorption factors, will have modulus values within the range of −150 to +350 p.s.i., −300 to +200 p.s.i. and −375 to +125 p.s.i., respectively, as compared to control black IRB #1. These values, then, define "standard" HAF, ISAF and SAF in terms of modulus values.

Because structure of carbon black is one of the several features which combine to make carbon blacks unique in the area of particulate solid matter, considerable effort has been spent in trying to modify the structure of any given grade of carbon black, particularly those grades with which this invention is concerned. Accordingly, it is now known that the mechanical breakdown as by ball milling or the like, referred to as attritioning, of a particular grade of carbon black results in a lowering of its structure (U.S. Pat. No. 3,024,092). It has also been recently discovered that any one of several techniques when applied to the incomplete combustion furnace process may be employed to control structure at various fineness levels, but only to the extent that structure can be reduced below the standard ranges (U.S. Pat. Nos. 3,010,794 and 3,010,795). Thus, it has become possible, by controlling the incomplete combustion furnace process, to produce carbon blacks within the fineness ranges of HAF, ISAF and SAF grades of furnace black having structure levels equivalent to and even lower than that of channel blacks. Until recently, however, all of these efforts not only appear to have been directed merely toward producing a lower structure but, in fact, the resulting processes are so limited. It has now been discovered, however, that the incomplete combustion furnace process can be modified, not only to lower structure at a particular fineness level, but also to raise it, as disclosed in U.S. Patent 3,222,131. It is with the use of reinforcing furnace blacks having a structure level considerably higher than that of standard reinforcing furnace blacks that this invention is concerned.

As described above, stereo-regulated synthetic rubber-like polybutadienes having high cis-1,4 isomer contents are plagued by serious processing difficulties which heretofore have been minimized only by blending the polymer with natural rubber or styrene-butadiene rubber. By "processing," as used herein, is intended the conventional meaning of the term as used throughout the art covering such physical manipulations of a rubber stock as mixing or milling, extrusion, fabrication and the like. In accordance with this invention, it has now been found that any of the high structure reinforcing furnace blacks described above, when incorporated in a cis-1,4 polybutadiene, permit the processing of the polymer with an ease heretofore unrealized. This easy processing, moreover, may be realized on a 100% polybutadiene, i.e., on a polybutadiene processed in the complete absence of blending with any other rubber. While it has been generally appreciated in the art that as structure of carbon black is raised an improvement of sorts in the processing of a rubber stock might be expected, the vastly improved results obtained by the present process go far beyond such expectations. The incorporation in cis-1,4 polybutadiene of standard structure reinforcing furnace blacks having structures in the upper limits of their standard ranges has been practiced with some improvement in the processing characteristics of the polybutadiene. Any such improvement, however, has been of a minor nature and of no practical significance since, in order to process such polymers on conventional factory equipment using such blacks, it is still necessary to blend the polymer with other rubbers. In view of this knowledge, therefore, the ease with which polybutadiene can be processed in accordance with the process of this invention through the use of the herein described high structure reinforcing furnace blacks, is completely unanticipated and unexpected. Not only can the processing be readily practiced on conventional factory equipment but, in addition, it can be practiced in the absence of blending without mill roll bagging and with good pigment dispersion to produce a product having excellent green strength, extrusion and tack properties.

In accordance with this invention, it has been found that the advantages above described can be readily obtained by employing HAF, ISAF and SAF grades of carbon black whose structure characteristics are represented by minimum oil absorption factors of at least about 140 ml./100 grams, 150 ml./100 grams and 165 ml./100 grams, respectively. Considerably higher structure blacks may be employed but correspondingly superior processing characteristics of the polybutadiene into which the black is incorporated are not necessarily obtained. In accordance herewith, it has been found that while HAF, ISAF and SAF blacks having structure characteristics greater than those represented by oil absorption factors of about 160 ml./100 grams, 170 ml./100 grams and 185 ml./100 grams, respectively, may be employed with complete success, the optimum ranges of oil factors for these three grades of black are 140–160 ml./100 grams, 150–170 ml./100 grams and 165–185 ml./100 grams.

In terms of modulus values, by means of which these carbon blacks may be more accurately characterized and by means of which the scope of the invention can be more specifically set forth the HAF, ISAF and SAF grades of carbon black employed in the process of this invention have minimum modulus variances from that of control black IRB #1 of about +450 p.s.i., +275 p.s.i. and +175 p.s.i., respectively, all modulus values being determined by ASTM D–1522–60T. These variances may range considerably higher than the minimums specified, although it does not necessarily follow that a correspondingly proportionate improvement in the processing characteristics of polybutadiene is observed. While any HAF, ISAF or SAF having a modulus value substantially equivalent to or greater than the minimums above specified may be employed in the process of this invention with success, the preferred and optimum ranges of modulus values for these three grades of black are +550 to +950 p.s.i., +400 to +775 p.s.i., and +300 to +675 p.s.i., respectively.

The amount of black incorporated into the rubber in accordance with this invention is, in general, similar to that incorporated when using standard blacks of similar fineness, i.e., about 60–80 parts of black/100 parts of rubber, usually about 70 parts/100. A particularly interesting advantage of this invention in this respect is that when a high structure black is employed in 100% stereo-regulated rubber, the resultant rubber surprisingly exhibits a higher Shore hardness than does a stereo-regulated rubber to which has been added an equivalent amount of a standard black of similar fineness. Accordingly, the amount of conventionally employed processing oil can be greatly increased, according to the process of this invention, while maintaining the same physical characteristics of the cured stock. It has been found that the carbon blacks employed in the present process can tolerate as much as 33⅓% more processing oil or softener than can standard carbon blacks of like fineness. For example, whereas 75 parts of a standard HAF black per 100 parts of polymer can tolerate a maximum of 37.5 parts of a softener, 75 parts of an HAF carbon black in accordance with this invention per 100 parts of polymer can tolerate 50 parts of softener. The economy that can be realized and enjoyed by this feature is obvious.

As employed herein the term "processing oil" or "softener" is intended to mean those materials which act in the manner of intermolecular lubricants and are referred to as "physical softeners" as contrasted to chemically active plasticizers or peptizers. A wide variety of materials which act in this manner are commercially available to the rubber trade. Many of these are of a proprietary nature whose compositions are sometimes not clearly specified. Such physical softeners, however, can be helpfully classified according to their sources. Thus, physical softeners may broadly be classified as petroleum derivatives such as naphthenic, aromatic and highly aromatic oils, resins, waxes, asphalts and the like; pine tree derivatives such as pine tar, pitch, resin and the like; coal tar products such as coal tar oils, pitch, resins and the like; and natural fats and oils such as vegetable oils, fatty acids and the like; as well as various synthetic organic compounds. These classes of softeners are well known in the art and certain softeners in certain of the classes have received wide commercial acceptance. Among these are the above mentioned petroleum derivatives classified as "naphthenic," "aromatic" and "highly aromatic" oils, and which comprise predominately the high resinous portions of high boiling petroleum distillates from which the paraffinic content has been largely extracted. Gravity and viscosity specifications of such oils were established in the Government synthetic rubber program as follows:

|  | Naphthenic | Aromatic | Highly Aromatic |
| --- | --- | --- | --- |
| Sp. Gr., 60° F./60° F. | 0.935–0.965 | 0.965–0.995 | 0.965–1.050 |
| Viscosity 595 @210° F. | 100 Max. | 100 Max. | 300 Max. |

Representative examples of commercially available material regularly employed by the rubber trade as physical softeners and falling within these three classes may be found in U.S. Patent No. 2,964,083.

Although the method of this invention has been particularly described with respect to solution polybutadienes which are unique in that they have a high cis-1,4 isomer content, it can also be practiced with equal success on emulsion polybutadienes, particularly those prepared at 41° F., which are neither cis nor trans oriented nor even mixtures, but rather are polybutadiene chains of random orientation. It can also, of course, be practiced on blends of the stereo-regular rubbers with either natural rubber or styrene-butadiene rubbers giving improved processing behavior even beyond that obtained by blending.

The following examples further illustrate the invention. All parts are by weight unless otherwise noted. In these examples, the polymers are observed during treatment as to milling behavior, i.e., the ability to mill readily and easily without bagging and without excessive sticking. In addition, the milled polymers are observed as to their property of tack, i.e., that characteristic which causes a polymer to adhere to itself which is so essential in the construction of composite articles such as tires. The milled polymers are also observed as to their property of extrusion, i.e., that ability to extrude uniformly with a smooth surface and with sharp edges.

Oil absorption factors in the following examples are determined by the following procedure: To 1 gram of powdered black placed on a smooth glass slab is added 3 drops of standard linseed oil from a 5 ml. burette, the oil being then worked into the black with a spatula. This procedure is repeated until the mixture rolls into a ball and holds together. Oil is then added 1 drop at a time, followed by thorough working with the spatula, until the mixture, when smeared across the glass slab with fairly heavy pressure on the spatula, is capable of producing a smooth smear unbroken in the center and unfeathered on the sides. When this occurs, the end point has been reached. The oil absorption factor is determined by multiplying the number of ml. required to reach the end point by 100.

*Example 1*

100 parts of a commercially available stereo-regular polybutadiene having a 95% cis-1,4 isomer content and a Mooney viscosity of about 40 ML-4 is loaded in a Banbury mixer and masticated for one minute. The following ingredients are then added to the Banbury:

| Ingredient: | Parts |
|---|---|
| Zinc oxide | 5 |
| Stearic acid | 1 |
| Antioxidant | 1 |
| Accelerator | 1.25 |
| Carbon black | 60 |

The carbon black is in the HAF fineness range and has an oil absorption factor of 142 ml./100 grams and a modulus value of +560 p.s.i. variance from that of IRB #1 as determined by ASTM D-1522-60T. The resulting batch is then masticated until the temperature is 250° F. at which point 30 parts of a highly aromatic processing oil are added. Mastication is continued until the temperature reaches 320–340° F. at which point mixing is complete. The batch is then dumped, sheeted out on an open roll mill, returned cool to the Banbury with 1¾ parts of sulfur and further mixed to a temperature of 225° F. The batch is then dumped and again sheeted out on an open mill. The mill processing behavior of the stock is excellent. It banks well and exhibits substantially no bagging. When extruded, the stock feeds well to the extruder and extrudes smoothly with sharp and unbroken edges and with little die swell. The stock exhibits excellent tack particularly at temperatures above ambient. In contrast, the same polybutadiene mixed in the same manner with 60 parts of a standard structure carbon black in the HAF fineness range, having an oil absorption factor of 110 ml./100 grams and a modulus value of +100 p.s.i. variance from that of IRB #1 as determined by ASTM D-1522-60T, exhibits very bad mill processing behavior. It banks poorly and bags excessively. When extruded, the stock does not feed well. The extruded product is rough with broken edges and extrusion is accompanied by considerable die swell. The stock is substantially devoid of tack even at temperatures above ambient.

*Example 2*

The procedure of Example 1 is repeated except that the carbon black within the HAF fineness range having an oil absorption factor of 142 ml./100 grams is replaced by the same amount of carbon black within the same fineness range having an oil absorption factor of 155 ml./100 grams and modulus value of +850 p.s.i. variance from that of IRB #1 as determined by ASTM D-1522-60T. Similar processing and tack improvements in the stock are experienced.

*Example 3*

The procedure of Example 1 is repeated except that the carbon black according to this invention and the processing oil are used in amounts to give carbon black/oil ratios of 52/20, 75/42.5 and 90/55. Similar ease in processing the stock is demonstrated in each instance.

*Example 4*

When the procedure of Example 1 is repeated using carbon blacks within the fineness range of ISAF, one of which has an oil absorption factor in accordance with this invention of 160 ml./100 grams and a modulus value of +500 p.s.i., and the other has a standard oil absorption factor of 130 ml./100 grams and a modulus value of −250 p.s.i., both modulus values being variances from that of IRB #1 as determined by ASTM D-1522-60T, a similar improvement in processing and tack properties are noted.

*Example 5*

The procedure of Example 4 is repeated employing a carbon black according to this invention within the fineness range of ISAF and which has an oil absorption factor of 170 ml./100 grams and a modulus value of +700 p.s.i. variance from that of IRB #1 as determined by ASTM D-1522-60T. A stock having excellent milling, extrusion and tack properties is again obtained.

*Example 6*

When the procedure of Example 1 is repeated using two carbon blacks within the SAF fineness range, one of which has an oil absorption factor according to this invention of 178 ml./100 grams and a modulus value of +450 p.s.i., and the other has a standard oil absorption factor of 135 ml./100 grams and a modulus value of −125 p.s.i., both modulus values being variances from that of IRB #1 as determined by ASTM D-1522-60T, a similar improvement in properties is noted.

*Example 7*

The procedure of Example 6 is repeated employing a carbon black according to this invention within the SAF fineness range and having an oil absorption factor of 185 ml./100 grams and a modulus value of +650 p.s.i. variance from that of IRB #1 as determined by ASTM D-1522-60T. Excellent milling, extrusion and tack properties are again exhibited by the stock.

*Example 8*

The procedure of Example 1 is repeated except that a commercially available stereo-regular polybutadiene having a cis-1,4 isomer content of 40% is employed. Similar improvements in the processing and tack properties of the stock are obtained.

*Example 9*

When the procedure of Example 8 is varied in accordance with modifications of Examples 2–7, similar improvements are noted.

To illustrate the advantage of this invention which permits the use of as much as 33⅓% more processing oil by weight per part of carbon black having the structure properties of this invention that can be used with standard physical properties the following example is given.

*Example 10*

The procedure of Example 1 is repeated three separate times under identical conditions except as indicated in Table I. The physical properties of the cured products are then tested, results appearing in Table I.

TABLE I

| Test No. | Structure Characteristics | | Parts Black | Parts Oil | Tensile Data at 80 Min., 280° F. Cure | | | Shore Hard. at 80 Min. |
|---|---|---|---|---|---|---|---|---|
| | Oil Factor (ml./100 gms.) | Mod. Var. from IRB #1* | | | Tens. (p.s.i.) | 300% Mod. (p.s.i.) | Elong. (percent) | |
| 1 | 110 | +100 | 60 | 20 | 2,000 | 900 | 535 | 59 |
| 2 | 142 | +560 | 60 | 20 | 2,380 | 1,580 | 425 | 63 |
| 3 | 142 | +560 | 60 | 30 | 2,100 | 1,190 | 500 | 59 |

*In ASTM D-1522-60T (p.s.i.)

The data of Table I clearly illustrates that the high structure black employed in accordance with this invention permits the use of a processing oil in an amount 33⅓% greater per part of carbon black than that employed with a standard structure black in the same fineness range while still obtaining substantially the same physical properties in the cured product.

*Example 11*

The procedure of Example 1 is repeated except that the polybutadiene in both instances is blended during mixing with natural rubber to give a polybutadiene/natural rubber ratio of 87.5/12.5. Similar improvements in processing and tack properties to those shown in Example 1 are exhibited by the blended stock mixed with the carbon black of this invention as compared to the blended stock mixed with the standard structure black of the same fineness range.

*Example 12*

The procedure of Example 11 is repeated except that the natural rubber is replaced with styrene-butadiene rubber. Similar improvements are noted.

*Example 13*

The two compositions of Example 1 are cured as separate treads on pneumatic tires and the tires road tested by running 7200 miles at 60 miles per hour using three section tires. The tread produced from the composition prepared according to the process of this invention exhibits 20-25% superior roadwear when compared to the tread produced from a composition prepared with a standard structure HAF carbon black.

*Example 14*

When tire treads are made from the compositions of Examples 11 and 12, superior roadwear is exhibited by the treads produced from the compositions prepared according to the process of this invention as compared with those treads produced from compositions prepared with a standard structure HAF carbon black.

I claim:
1. In the production of a vulcanized polybutadiene rubber in which a rubber stock comprising a polymer consisting essentially of a stereo-regular polybutadiene at least about 40% of the 1,4-butadiene units of which comprise the cis-1,4 isomer is subjected to processing and then vulcanization, the method of improving the mixing, milling, extrusion and tack properties of such a rubber stock during processing thereof and of producing a vulcanized polybutadiene rubber of improved Shore hardness, which comprises: processing a rubber stock comprising such a polymer, a vulcanizing agent, and a carbon black within the fineness range of HAF, ISAF and SAF grades of reinforcing furnace blacks, but having structure characteristics, as represented by modulus values, which vary by at least about +450 p.s.i., +275 p.s.i. and +175 p.s.i., respectively, from those of Industry Reference Black #1 as determined by ASTM D-1522-60T; and vulcanizing the resultant processed stock.

2. A method according to claim 1 in which said carbon black is within the fineness range of HAF but has a modulus value which varies by about +550 p.s.i. to about +950 p.s.i. from that of Industry Reference Black #1 as determined by ASTM D-1522-60T.

3. A method according to claim 1 in which said carbon black is within the fineness range of ISAF but has a modulus value which varies by about +400 p.s.i. to about +775 p.s.i. from that of Industry Reference Black #1 as determined by ASTM D-1522-60T.

4. A method according to claim 1 in which said carbon black is within the fineness range of SAF but has a modulus value which varies by about +300 p.s.i. to about +675 p.s.i. from that of Industry Reference Black #1 as determined by ASTM D-1522-60T.

5. A method according to claim 1 in which the rubber stock comprises said carbon black, said polymer and a processing oil, said carbon black and said polymer being in a ratio by weight of at least about 60 parts carbon black per 100 parts polymer, said processing oil and said carbon black being in a ratio by weight of at least about 30 parts processing oil per 60 parts carbon black.

6. A vulcanizable rubber composition comprising a polymer consisting essentially of a stereo-regular polybutadiene at least about 40% of the 1,4-butadiene units of which comprise the cis-1,4 isomer, a vulcanizing agent, and a carbon black within the fineness range of HAF, ISAF and SAF grades of reinforcing carbon blacks, but having structure characteristics, as repreesnted by modulus values, which vary by at least about +450 p.s.i., +275 p.s.i. and +175 p.s.i., respectively, from those of Industry Reference Black #1 as determined by ASTM D-1522-60T.

7. A composition according to claim 6 in which said carbon black is within the fineness range of HAF but has a modulus value which varies by about +550 p.s.i. to about +950 p.s.i. from that of Industry Reference Black #1 as determined by ASTM D-1522-60T.

8. A composition according to claim 6 in which said carbon black is within the fineness range of ISAF but has a modulus value which varies by about +400 p.s.i. to about +775 p.s.i. from that of Industry Reference Black #1 as determined by ASTM D-1522-60T.

9. A composition according to claim 6 in which said carbon black is within the fineness range of SAF but has a modulus value which varies by about +300 p.s.i. to about +675 p.s.i. from that of Industry Reference Black #1 as determined by ASTM D-1522-60T.

10. A vulcanizable rubber composition according to claim 6 comprising said carbon black, said polymer and a processing oil, said carbon black and said polymer being in a ratio by weight of at least about 60 parts carbon black per 100 parts polymer, and said processing oil and said carbon black being in a ratio of at least about 30 parts processing oil per 60 parts carbon black.

11. A pneumatic tire comprising a tread portion prepared from the composition of claim 6.

12. A pneumatic tire comprising a tread portion prepared from the composition of claim 7.

13. A pneumatic tire comprising a tread portion prepared from the composition of claim 8.

14. A pneumatic tire comprising a tread portion prepared from the composition of claim 9.

15. A pneumatic tire comprising a tread portion prepared from the composition of claim 10.

No references cited.

MORRIS LIEBMAN, *Primary Examiner.*

A. LIEBERMAN, *Assistant Examiner.*